(12) United States Patent
Chang et al.

(10) Patent No.: US 9,071,486 B2
(45) Date of Patent: Jun. 30, 2015

(54) EFFICIENT NOISE CANCELING CIRCUIT FOR RECEIVERS

(71) Applicant: Oracle International Corporation, Redwood City, CA (US)

(72) Inventors: Eric Chang, San Mateo, CA (US); Frankie Y. Liu, Palo Alto, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 4 days.

(21) Appl. No.: 13/944,463

(22) Filed: Jul. 17, 2013

(65) Prior Publication Data

US 2014/0269956 A1   Sep. 18, 2014

Related U.S. Application Data

(60) Provisional application No. 61/794,770, filed on Mar. 15, 2013.

(51) Int. Cl.
*H04L 1/00* (2006.01)
*H04L 25/08* (2006.01)
*H04L 25/03* (2006.01)

(52) U.S. Cl.
CPC .............. *H04L 25/08* (2013.01); *H04L 1/0036* (2013.01); *H04L 1/0033* (2013.01); *H04L 1/0031* (2013.01); *H04L 25/03006* (2013.01); *H04L 25/03* (2013.01); *H04L 1/003* (2013.01)

(58) Field of Classification Search
CPC ....... H04L 1/0029; H04L 1/03; H04L 1/0031; H04L 25/03006; H04L 25/03; H04L 1/0021; H04L 1/0036; H04L 1/0033; H04L 25/08; H04L 1/003
USPC .......................................... 375/229–232, 295
See application file for complete search history.

(56) References Cited

U.S. PATENT DOCUMENTS

| 4,635,217 A * | 1/1987 | O'Connor et al. ............ 702/193 |
| 2005/0157780 A1 * | 7/2005 | Werner et al. ................. 375/232 |
| 2013/0272446 A1 * | 10/2013 | Stojanovic et al. ........... 375/295 |

* cited by examiner

*Primary Examiner* — Daniel Washburn
*Assistant Examiner* — Eboni Hughes
(74) *Attorney, Agent, or Firm* — Park, Vaughan, Fleming & Dowler LLP (57) ABSTRACT

The disclosed embodiments provide a system that tracks and compensates for input signal noise at a receiver of a data communication channel. In particular embodiments, the receiver of the data communication link receives an input signal which comprises two signal levels. Next, for each of the two signal levels, the system generates an error signal by comparing the input signal value of the signal level with an expected signal value for the signal level. The system then updates a threshold signal value based on at least one of the two error signals associated with the two signal levels. Finally, the system compensates for input signal noise in the received input signal using the updated threshold signal value.

20 Claims, 5 Drawing Sheets

SYSTEM 100

EFFICIENT NOISE CANCELING CIRCUIT FOR RECEIVERS

RELATED APPLICATION

This application claims priority under 35 U.S.C. §119(e) to U.S. Provisional Application Ser. No. 61/794,770, entitled "Efficient Noise Canceling Circuit," by inventors Eric Chang and Frankie Liu, filed on Mar. 15, 2013, the contents of which is herein incorporated by reference.

GOVERNMENT LICENSE RIGHTS

This invention was made with Government support under Agreement No. HR0011-08-9-0001 awarded by DARPA. The Government has certain rights in the invention.

BACKGROUND

1. Field

The present embodiments generally relate to techniques for communicating data between a transmitter and a receiver. More specifically, the present embodiments relate to a method and system for suppressing bounded and sufficiently band-limited noise in the received data at a receiver.

2. Related Art

During high-speed data signaling in a high-speed serial link system, data signals are transmitted from transmitting integrated circuit (IC) devices to receiving IC devices over a high-speed channel. In such a high-speed serial link system, external noise sources such as crosstalk noise from adjacent channels, power supply fluctuations, or varying channel characteristics can often be detrimental to the overall performance of the system. Numerous control circuits, such as adaptive equalization, power supply regulators, or periodic calibration circuits are presently used to suppress the effects of this external noise.

One popular noise cancellation technique is to employ a differential architecture. Such an architecture uses two channels, one for transmitting the data signal and the other for transmitting the complement of the data signal. Subsequently, at the receiver, the difference between the two received data signals is detected and amplified to obtain the digital signal levels. In this manner, common-mode noise that equally affects both channels will be canceled out. Although the differential signaling approach essentially doubles the transceiver power and the amount of wires with little improvement in achievable bandwidth, it is often the most effective way to mitigate external noise that is high frequency in nature or has a high dynamic range. However, in systems where crosstalk noise from adjacent channels is negligible and most of the noise is the result of environmental fluctuations (e.g., temperature, voltage), using the differential signaling may not be the most effective way to mitigate the noise considering the cost of doubling the power and increasing the size of the device.

Hence, what is needed is a method and a system for suppressing bounded and sufficiently band-limited noise in a data communication system.

SUMMARY

The disclosed embodiments provide a system that tracks and compensates for an input signal noise at a receiver of a data communication channel. In particular embodiments, the receiver of the data communication link receives an input signal which comprises two signal levels. Next, for each of the two signal levels, the system generates an error signal by comparing the input signal value of the signal level with an expected signal value for the signal level. The system then updates a threshold signal value based on at least one of the two error signals associated with the two signal levels. Finally, the system compensates for input signal noise in the received input signal using the updated threshold signal value.

In some embodiments, the system initializes the threshold signal value using a training data pattern prior to receiving an input signal.

In some embodiments, the two signal levels correspond to logic one and logic zero, respectively, and the threshold signal value is substantially halfway between the two signal levels.

In some embodiments, the system updates the expected signal value for each of the signal levels based at least on the associated error signal.

In some embodiments, the system updates the expected signal value for each of the two signal levels by accumulating the associated error signal using a digital accumulator. The system then uses the digital output of the digital accumulator to represent the digital expected signal value for the signal level.

In some embodiments, the system converts the digital expected signal value to an analog expected signal value for the signal level.

In some embodiments, the system updates the threshold signal value by computing an average value of the two digital expected signal values for the two signal levels.

In some embodiments, the system updates the threshold signal value by first computing the average of the two error signals to obtain an average error signal. Next, the system obtains an updated threshold signal value by adding the average error signal to the threshold signal value.

In some embodiments, the system updates the threshold signal value by adding one of the two error signals to the threshold signal value.

In some embodiments, the input signal is received at the receiver of a single-ended data signaling channel.

In some embodiments, the threshold signal value is used to track and cancel common-mode noise in both of the two signal levels.

The disclosed embodiments also provide a noise-tracking circuit for tracking and compensating for noise in an input signal. More specifically, the noise-tracking circuit includes a first channel configured to track the signal value associated with a first signal level of the input signal. The noise-tracking circuit also includes a second channel coupled in parallel to the first channel and configured to track the signal value associated with a second signal level of the input signal. The noise-tracking circuit additionally includes an averaging circuit coupled to an output of the first channel and an output of the second channel and configured to generate a threshold signal value substantially halfway between the first and second signal levels.

In some embodiments, each of the first channel and second channel of the noise-tracking circuit further includes: a level comparator to generate an error signal by comparing the signal value of the associated signal level of the input signal with an expected signal value of the associated signal level; a digital accumulator, coupled to the output of the level comparator, to accumulate the associated error signal; and a digital-to-analog converter, coupled to the output of the digital accumulator, to convert the output of the digital accumulator to the expected signal value of the associated signal level.

In some embodiments, the input signal is coupled to an input of the level comparator in each of the first channel and the second channel.

In some embodiments, the level comparator in each of the first channel and the second channel receives a common clock signal which determines the sampling rate of the error signal.

In some embodiments, the digital accumulator of the first channel is enabled when the signal value of the input signal is associated with the first signal level, and is disabled when the signal value of the input signal is associated with the second signal level. In contrast, the digital accumulator of the second channel is enabled when the signal value of the input signal is associated with the second signal level, and is disabled when the signal value of the input signal is associated with the first signal level.

In some embodiments, the averaging circuit receives the error signals from the outputs of the two level comparators. This averaging circuit is configured to generate the threshold signal value based at least on the average of the two error signals.

In some embodiments, the averaging circuit receives the accumulated error signals from the outputs of the digital accumulators. This averaging circuit is configured to generate the threshold signal value based at least on the average of the two accumulated error signals.

In some embodiments, the two signal levels correspond to logic one and logic zero, respectively.

In some embodiments, the circuit is located on a receiver of a single-ended data signaling channel.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The disclosed embodiments provide a method and a system for tracking and compensating for input signal noise at a receiver of a data communication channel. In particular embodiments, the receiver of the data communication channel receives an input signal which comprises two signal levels: logic one (or "1") and logic zero (or "0"). Next, for each of the two signal levels, the system generates an error signal by comparing the input signal value of the signal level with an expected signal value for the signal level. In particular embodiments, the system updates the expected signal value by accumulating the associated error signal using a digital accumulator, and subsequently generating the expected signal value for a given signal level by converting the digital accumulator output to an analog signal value. The system then updates a threshold signal value based on at least one of the two error signals associated with the two signal levels. Finally, the system compensates for input signal noise in the received input signal using the updated threshold signal value.

The disclosed embodiments also provide a noise-tracking circuit for tracking and compensating for noise in an input signal. More specifically, the noise-tracking circuit includes a first channel configured to track the signal value associated with a first signal level of the input signal. The noise-tracking circuit also includes a second channel coupled in parallel to the first channel and configured to track the signal value associated with a second signal level of the input signal. The noise-tracking circuit additionally includes an averaging circuit coupled to an output of the first channel and an output of the second channel and configured to generate a threshold signal value substantially halfway between the first and second signal levels.

Figure 1A:
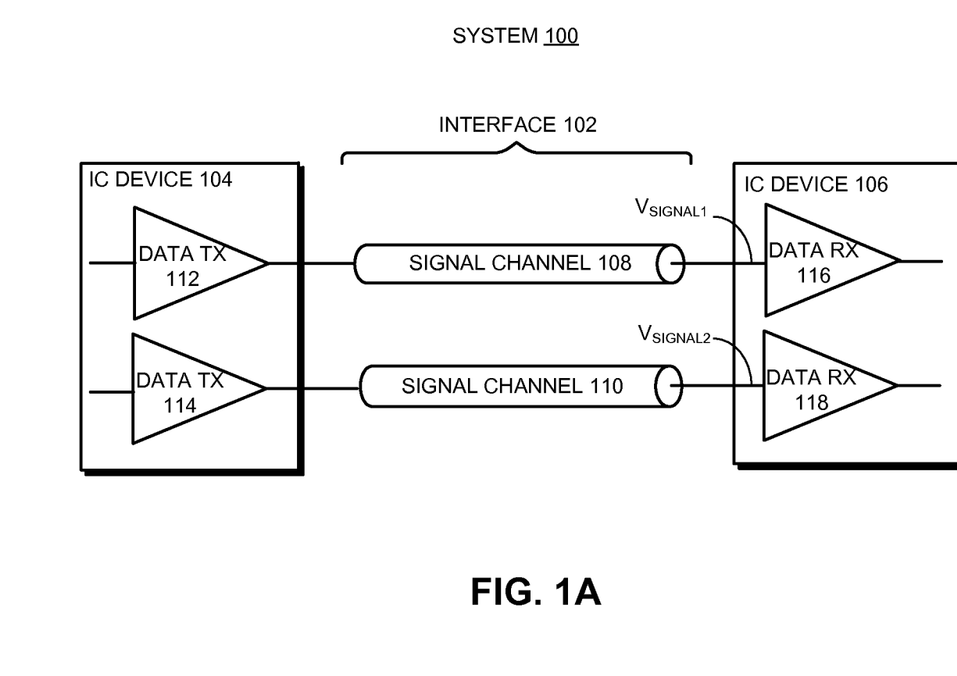
FIG. 1A presents a block diagram illustrating a system (e.g., for chip-to-chip communication) which transmits a first signal and a second signal over an interface.

During high-speed data signaling in a data communication system, data signals are transmitted from transmitting integrated circuit (IC) devices to receiving IC devices over a high-speed channel. More specifically, FIG. 1A presents a block diagram illustrating a system 100 (e.g., for chip-to-chip communication) which transmits a first signal and a second signal over an interface 102. System 100 includes a first IC device 104 and a second IC device 106 coupled through interface 102, which further includes a first signal channel 108 and a second signal channel 110. IC device 104 can further include a data transmitter 112 and a data transmitter 114; while IC device 106 can further include a data receiver 116 and a data receiver 118. Note that system 100 may include additional signal channels coupled between additional transmitter-receiver (or "transceiver") pairs (not shown) for transmitting and receiving additional signals.

During high-speed data communication, IC device 104 generates a first data signal, which is then transmitted by data transmitter 112 over signal channel 108, and received by data receiver 116 on IC device 106 as a received data signal $V_{signal1}$. IC device 104 can also generate a second data signal, which is then transmitted by data transmitter 114 over signal channel 110, and received by data receiver 118 on IC device 106 as a received data signal $V_{signal2}$. Note that each of the received data signals $V_{signal1}$ and $V_{signal2}$ can have a noise component due to crosstalk noise (e.g., between the two transmitted signals), power supply and temperature fluctuations, and other sources of noise from the channel characteristics of interface 102.

To mitigate the received signal noise in $V_{signal1}$ and $V_{signal2}$, differential architectures are often employed by using two substantially identical channels for each of the signal channels 108 and 110 (not shown): one for transmitting the data signal and the other for transmitting the complement of the data signal. Although the differential signaling approach essentially doubles the transceiver power and the amount of wires, it is often the most effective way to mitigate external noise that is high frequency in nature (such as the crosstalk noise) or has a high dynamic range.

Figure 1B:
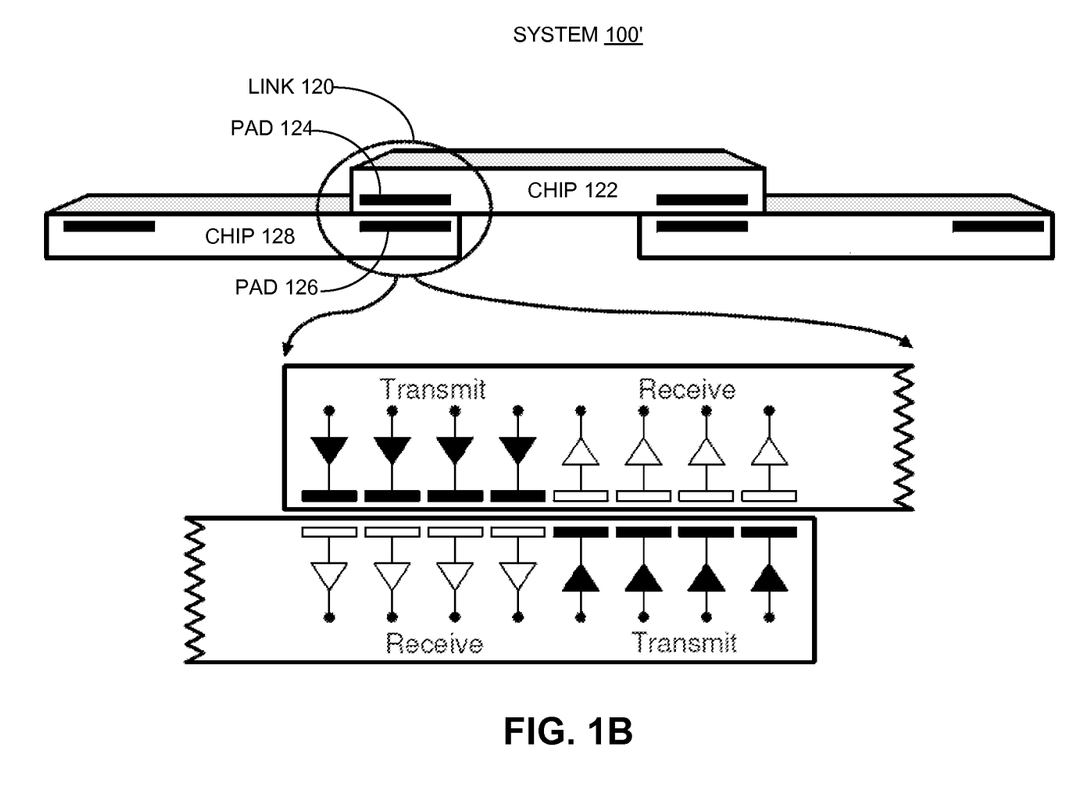
FIG. 1B illustrates an embodiment of the system in FIG. 1A which has band-limited and bounded noise characteristics.

However, in some embodiments of system 100, crosstalk from adjacent channels, such as between channels 108 and 110, is negligible, while most of the noise is the result of environmental fluctuations (e.g., temperature, voltage, etc.). If the dominant sources of the noise are sufficiently band-limited and bounded (such as these environmental fluctuations), they may be tracked and compensated without employing the differential architecture, and as a result, this high power and high device area penalty may be avoided. FIG. 1B illustrates an embodiment of system 100 (or system 100') which has band-limited and bounded noise characteristics. More specifically, system 100' comprises a capacitively coupled data communication link 120. Link 120 further includes a driver on a first chip 122 which drives a metal pad 124 on its top metal layer. A facing metal pad 126 on a second chip 128, coupled to the first pad 124, allows data to be transmitted between chips 122 and 128. In system 100', the signal amplitude is a function of mechanical chip alignment, which varies over time due to thermal expansion or vibration of the metal pads. However, since vibration and thermal expansion are relatively slow mechanical processes, and the alignment is fixed to a certain degree by packaging, the noise introduced from pad misalignment will be bounded and band-limited.

Figure 2A:
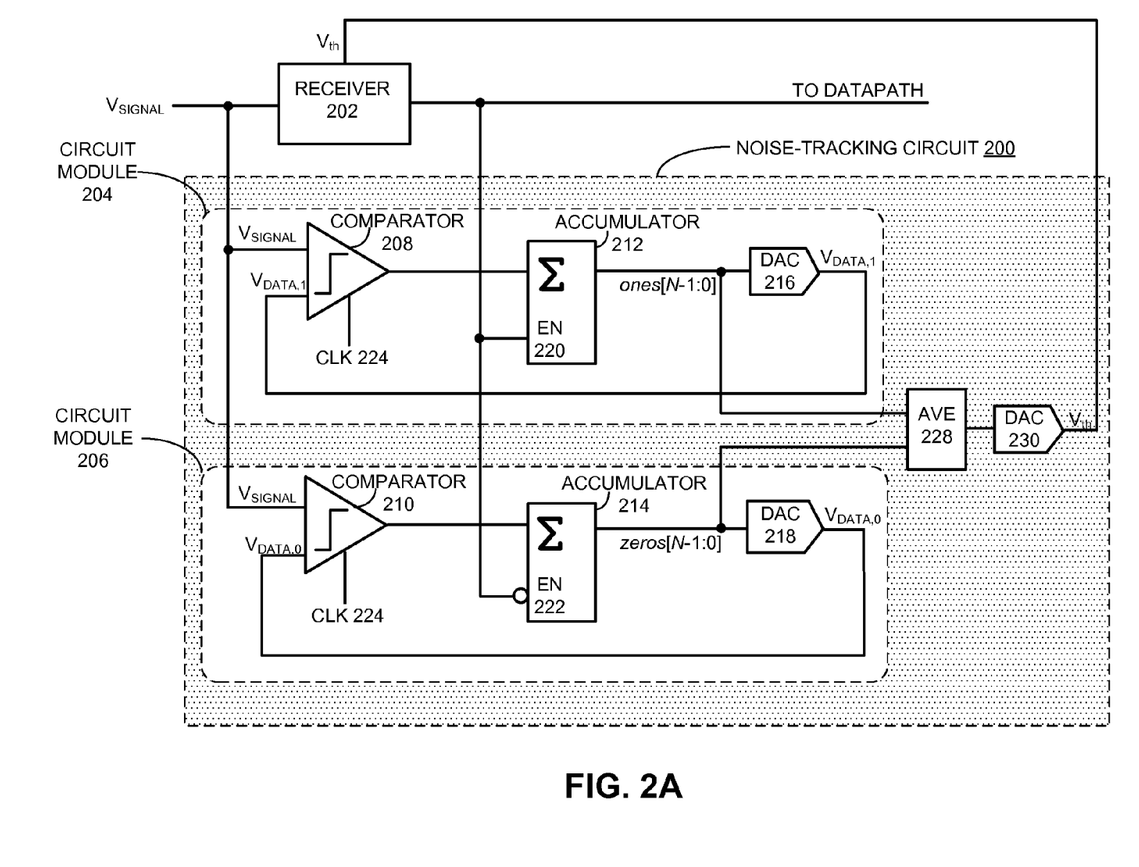
FIG. 2A presents a block diagram of a noise-tracking circuit located at the receiver-side of a signal link for tracking and compensating for bounded and substantially band-limited noise sources in accordance with some embodiments herein.

FIG. 2A presents a block diagram of a noise-tracking circuit 200 located at the receiver-side of a signal link for tracking and compensating for bounded and substantially band-limited noise sources in accordance with some embodiments herein.

As can be seen at the top of FIG. 2A, an input signal $V_{signal}$, which is received at the receiver-side of the signal link, drives a receiver 202. Note that receiver 202 can include any existing or future developed design of a signal receiver. During normal transceiver operation, receiver 202 is configured to subtract a threshold voltage signal value $V_{th}$ from the input signal $V_{signal}$. Ideally, this threshold voltage signal value $V_{th}$ (or "threshold value $V_{th}$") should be set in the middle of the two received signal levels "1" and "0." As a result, receiver 202 outputs a digital "1" if the subtraction result is positive, or "0" if the subtraction result is negative.

Note that in conventional techniques, threshold value $V_{th}$ is often only calibrated once at system startup but not updated in real time during normal system operation. However, if the input signal levels drift due to environmental fluctuations during system operation, while threshold value $V_{th}$ remains the same, receiver 202 output error can occur. Also note that when the noise frequency is significantly slower than the data rate, the input signal level drift becomes an envelope or amplitude modulation of the input data, which also causes the middle level between the two signal levels to drift. In one embodiment, noise-tracking circuit 200 is used, in real time, to track both "1" and "0" signal levels at each point in time, and to update the threshold value $V_{th}$.

To do so, input signal $V_{signal}$ is coupled to an input of noise-tracking circuit 200 (also referred to as "circuit 200"), shown within the shaded box, which operates in parallel with receiver 202. In some embodiments, noise-tracking circuit 200 continuously measures and stores the received signal values for logic "1" and "0". If these signal levels drift, noise-tracking circuit 200 dynamically adjusts the receiver's threshold value $V_{th}$ to compensate for such drift.

More specifically, noise-tracking circuit 200 includes two independent channels: circuit module 204 inside the top white box which tracks the logic "1" signal value, and circuit module 206 inside the bottom white box which tracks the logic "0" signal value. Note that circuit module 204 and circuit module 206 may be configured substantially identically to each other. As can be seen, each of circuit module 204 and circuit module 206 includes a "level comparator" (i.e., comparator 208 and comparator 210, respectively). Each of the comparators receives input signal $V_{signal}$ at a first input port. In some embodiments, each level comparator is implemented using a sense amplifier. The output of each of these level comparators drives a respective digital accumulator (i.e., accumulator 212 and accumulator 214, respectively), and the output of each of the digital accumulators drives a respective digital-to-analog converter (DAC) (i.e., DAC 216 and DAC 218, respectively). The output of each of the DACs 216 and 218 is coupled back to a second input port of a respective comparator, which forms a respective feedback loop within the respective circuit module.

We now describe more detailed operation of noise-tracking circuit 200. Note that circuit module 204 and circuit module 206 are typically alternately enabled. This is achieved by alternately enabling the two accumulators 212 and 214 by coupling the digital output of receiver 202 to the enable input (EN 220 and EN 222) of each of the accumulators 212-214. Consequently, accumulator 212 is enabled only when the received data signal is a logic "1" while accumulator 214 is enabled only when the received data signal is a logic "0." Because of the similarity of the actual operation once a circuit module is enabled, we describe the operation of circuit module 204 associated with the logic "1" signal level below. The described operation can be easily modified and applied to circuit module 206 associated with the logic "0" signal level.

During normal operation of receiver 202, circuit module 204 is enabled when the received data signal corresponds to logic "1." Comparator 208 compares the newly received analog input voltage $V_{signal}$ with an expected analog voltage value $V_{data,1}$ for logic "1," which is the feedback from the output of DAC 216. If the newly received logic "1" level of $V_{signal}$ drifts upward, comparator 208 will detect that the new "1" level is higher than the expected value $V_{data,1}$ (i.e., $V_{signal} > V_{data,1}$), and subsequently output a high value or "1." On the other hand, if the newly received "1" level of $V_{signal}$ drifts downward, comparator 208 will detect that the new "1" level is lower than the expected value $V_{data,1}$ (i.e., $V_{signal} < V_{data,1}$), and subsequently output a low value or "0." However, if the newly received $V_{signal}$ values are steady, the comparator 208 output will toggle between high and low, or between "1" and "0." Hence, the comparator output can be seen as an error signal which tracks the analog received signal voltages corresponding to logic "1."

In one embodiment, comparator 208 is driven by a sampling clock "clk" 224, which determines the sampling rate for the analog input signal $V_{signal}$. In one embodiment, the sampling rate of comparator 208 is determined based on the bandwidth associated with the type of noise being tracked. To effectively track and compensate for a given noise source, the sampling rate should be sufficiently high. In circuit 200, the sampling rate of level comparator 210 within circuit module 206 is determined by the same sampling clock "clk" 224 applied to level comparator 210.

Note that accumulator 212 stores the digital output of level comparator 208 and outputs a digital representation of logic "1." In one embodiment, accumulator 212 is a digital accumulator comprising a bank of registers. For example, to represent logic "1" with ten bits, a bank of ten registers is typically needed within accumulator 212. In the embodiment of FIG. 2A, accumulator 212 outputs a digital value ones[N−1:0] as the N-bit digital representation of an analog tracking voltage for logic "1." In one embodiment, N=10 for a 10-bit digital representation of logic "1." Note that the length of ones[N−1:0] determines the resolution of the digital representation of "1." Also, note that accumulator 212 is enabled only when its enable input 220 receives a logic "1."

Note that the value of accumulator 212 output moves up and down according to the comparator 208 output. When the comparator output includes more "1"s as the input signal $V_{signal}$ drifts upward, the accumulator output will increase (unless it has already reached a maximum). When the comparator output includes more "0"s as the input signal $V_{signal}$ drifts downward, the accumulator output will decrease accordingly (unless it has already reached a minimum). However, when the input signal $V_{signal}$ is flat (i.e., at a steady state), the comparator output will toggle between "1"s and "0"s, and the accumulator 212 output will move up and down around the input signal level with a zero net effect. Consequently, the accumulator 212 output captures the net effect of input voltage drifts, with an associated quantization error associated with the digital value ones[N−1:0]. Next, the digital output of accumulator 212 is converted back to an analog voltage value of logic "1" by DAC 216, which is then used as the expected analog voltage value $V_{data,1}$, i.e., the feedback to level comparator 208.

When accumulator 214 is enabled when its enable input 222 receives a logic "0," circuit module 206 operates in substantially the same manner as described above, except for tracking logic "0" instead of logic "1." As such, accumulator 214 outputs a digital value zeros[N−1:0] as the N-bit digital representation of an analog tracking voltage for logic "0," and DAC 218 outputs an analog voltage value of logic "0" as the expected analog voltage value $V_{data,0}$, which is feedback to comparator 210. Hence, the two feedback loops within noise tracking circuit 200 cause the analog voltage values $V_{data,1}$ and $V_{data,0}$ to independently track the two signal levels "1" or "0" within the analog received signal $V_{signal}$.

Because the two digital values ones[N−1:0] and zeros[N−1:0] continuously track the analog input signal $V_{signal}$, they can be used to compute a real-time update of the threshold voltage signal value $V_{th}$. In the embodiment of circuit 200, an averaging circuit "AVE" 228 is used to compute the average of the two digital values ones[N−1:0] and zeros [N−1:0]. The output of AVE 228, which is halfway between the two real-time updated expected signal values, can be used as the updated threshold value $V_{th}$. Because this output is a digital signal, a DAC 230 may be used to convert the digital threshold value $V_{th}$ to the analog threshold value $V_{th}$. Note that the output of DAC 230 is used as the updated threshold value $V_{th}$ for receiver 202.

Note that comparators 208 and 210 may not be perfectly identical and each can have an intrinsic offset. Hence, using the above technique to compute the updated threshold value $V_{th}$ based on the average of the two accumulator outputs also includes all of the comparator offsets into the threshold value $V_{th}$. In one embodiment, other than computing the average of the two accumulator outputs, the system tracks the outputs from the two comparators, referred to as "deltas," and uses these deltas to update the threshold value $V_{th}$.

Figure 2B:
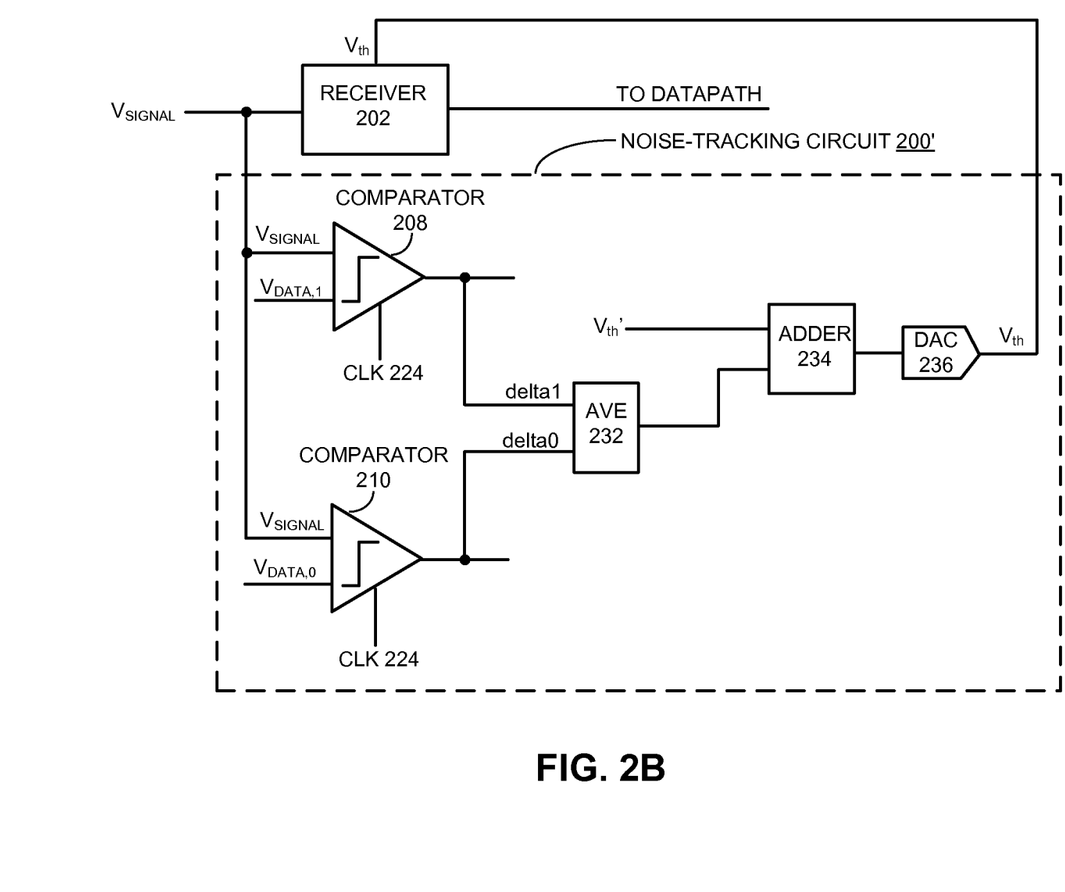
FIG. 2B presents a block diagram of a partial noise-tracking circuit which includes a circuitry for updating the threshold value $V_{th}$ in accordance with some embodiments herein.

FIG. 2B presents a block diagram of a partial noise-tracking circuit 200' which includes a circuitry for updating the threshold value $V_{th}$ in accordance with some embodiments herein. Note that noise-tracking circuit 200' also includes circuit modules 204 and 206 as in noise-tracking circuit 200, but uses a different technique for generating the updated threshold value $V_{th}$. More specifically, in the embodiment of FIG. 2B, an averaging circuit "AVE" 232 is used to compute the average of the comparator 208 output delta1 and the comparator 210 output delta0. Note that these delta values represent the updates of signal level drifts of the two signal levels, while the output of AVE 232 represents the average of the updates of the two signal level drifts.

The output of AVE 232 is then added to the most recently updated threshold value $V_{th}$' by an adder 234 to obtain a new updated threshold value $V_{th}$. Because this output is a digital signal, a DAC 236 is used to convert the digital threshold value $V_{th}$ to the analog threshold value $V_{th}$. The output of DAC 236 is then used as the updated threshold value $V_{th}$ for receiver 202. Note that the $V_{th}$ update technique described in conjunction with FIG. 2B may begin with an initialized threshold value $V_{th}$ which has been calibrated for the comparator offsets. Hence, the subsequently updated threshold value $V_{th}$ does not include the effects from these comparator offsets. While the following discussion refers to noise-tracking circuit 200, the techniques described below also apply to noise-tracking circuit 200' described in FIG. 2B.

Note that the initial threshold value $V_{th}$ may be calibrated and set at the system startup using a training sequence. In one embodiment, to initialize noise-tracking circuit 200, a training sequence may be executed at the system startup. More specifically, the transmitter sends a preset data pattern of an equal number and evenly spaced "1"s and "0"s, such as a pattern "1010 . . . . " The system then uses noise-tracking circuit 200 to initialize ones[N−1:0] and zeros[N−1:0], and subsequently compute an initial threshold value $V_{th}$ based on the initialized ones[N−1:0] and zeros[N−1:0]. Note that the initial threshold value $V_{th}$ is substantially the middle level between the preset analog "1" and "0" logic levels.

As mentioned above, the common sampling clock 224 determines the rate of updates of signal values ones[N−1:0] and zeros[N−1:0], and therefore the rate of update of threshold value $V_{th}$. When the sampling rate is sufficiently high, circuit 200 is able to track the drifts in both signal levels with high accuracy. Hence, by using the average of the two signal values ones[N−1:0] and zeros[N−1:0] as the updated threshold value $V_{th}$ for receiver 202, the system can effectively cancel out the band-limited and common-mode noise of the two signal levels which are being tracked by the two circuit modules 204 and 206.

Figure 3:
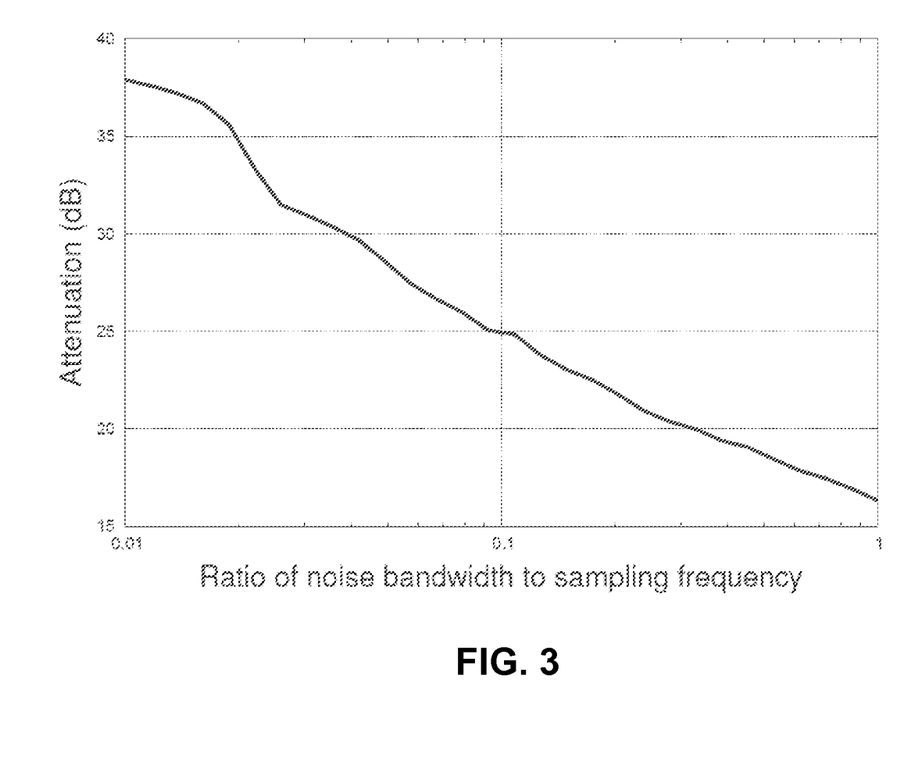
FIG. 3 illustrates the simulated noise attenuation as a result of using the noise-tracking circuit as a function of the noise frequency in accordance with some embodiments herein.

FIG. 3 illustrates the simulated noise attenuation as a result of using noise-tracking circuit 200 as a function of the noise frequency in accordance with some embodiments herein. Note that in FIG. 3, the noise frequency on the horizontal axis is expressed as ratio of noise bandwidth to the sampling frequency of the noise tracking circuit. In this specific example, it can be observed that to achieve 30 dB attenuation, the sampling frequency of the noise-tracking circuit needs to be at least 28× the noise bandwidth. While it is desirable to operate circuit 200 with a high sampling rate, a higher sampling rate also leads to higher power consumption.

Note that quantization of the two digital signal values also affects how well circuit 200 tracks a noise level within the input signal $V_{signal}$. In one embodiment, the quantization is determined by the value of N in the digital representations ones[N−1:0] and zeros [N−1:0]. A larger N value leads to a smaller quantization step size and a smaller quantization error, whereas a smaller N value leads to a larger quantization step size and a larger quantization error. However, when the quantization step size is too small while the sampling rate is not fast enough, the update of threshold value $V_{th}$ may lag behind the input signal $V_{signal}$ drift.

In one embodiment, instead of using a higher sampling rate, a larger quantization step size may be used to track the noise in the input signal levels more rapidly, but at the cost of increased quantization error. Note that while the quantization is determined by the value of N in the digital representations ones[N−1:0] and zeros[N−1:0], changing the value of N in order to change the quantization step size may be difficult. In one embodiment, the quantization step size may be alternatively adjusted by adjusting the comparator output. More specifically, instead of outputting ones or zeros for each sampling update, comparators 208 and 210 can output "2s," "4s" or even larger values for each sampling update. Hence, accumulators 212 and 214 receive larger values for each input update. Consequently, while the value of N in the digital representations ones[N−1:0] and zeros [N−1:0] remains the same, the technique effectively increases the quantization step size.

Those of ordinary skill in the art will appreciate that a trade-off exists between the sampling rate and the quantization step size in circuit 200. More specifically, a higher sampling rate within circuit 200 allows for a smaller quantization step size and smaller quantization error, but at the expense of higher system power consumption. On the other hand, a larger quantization step size used by circuit 200 allows for a lower sampling rate and lower power consumption, but at the expense of a higher quantization error and less effectiveness of noise tracking and cancellation. In some embodiments, circuit 200 includes mechanisms to dynamically adjust one or both of the step size and the sampling rate.

Note that when noise-tracking circuit 200 continuously updates in the same direction (i.e., the updated threshold value $V_{th}$ constantly increases or decreases), it may be an indicator that the $V_{th}$ update lags behind the input signal $V_{signal}$ changes. Otherwise, when the $V_{th}$ update is sufficiently fast, it is expected that the updated digital value of $V_{th}$ toggles. In one embodiment, noise-tracking circuit 200 includes a detection mechanism to detect such monotonic updates. If detected, noise-tracking circuit 200 is configured to perform one of the two operations. First, circuit 200 can be configured to increase the step size, referred to as an "adaptive step size." For example, comparators 208 and 210 can output larger update values as described above. Second, circuit 200 can be configured to increase the sampling rate of the common sampling clock, referred to as an "adaptive sampling rate." That is, while using the same step size, a greater number of updates can be performed in the same time interval. Note that such adaptive noise tracking techniques can be particularly useful in handling steps/transients in the input signal value $V_{signal}$.

Note that in the above described operation of circuit 200, it is assumed that both circuit modules 204 and 206 need to operate in order to update the threshold value $V_{th}$. In some embodiments, if it can be determined that the distance between the two input signal levels "1" and "0" is substantially a constant over time (i.e., the two signal levels generally change in tandem), one may only need to track one of the two signal levels, and predict the threshold value $V_{th}$ based on the single signal level being tracked. As a result, only one of the two circuit modules 204 and 206 is needed to track the associated signal level. However, in doing so, if an input signal value is other than the one being tracked, the circuit needs to skip that particular update cycle. Note that, if the input signal is DC balanced, this technique of using only a single tracking module may operate at a reduced update rate. Moreover, if the two input signal levels drift more independently, such that the distance between the two input signal levels contracts and expands, this technique will generally not be effective.

Note that one intrinsic characteristic of the noise-tracking circuit 200 is that the update rate is typically dependent on the pattern of data received. For example, if a long string of "1"s is transmitted, receiver 202 will not "see" the "0" signal level for a certain period of time. As a result, the expected analog voltage value $V_{data,0}$ can quickly become very different from the actual "0" signal level. One remedy for this issue is to DC-balance the input signal, such as by using a proper encoding.

However, having a balanced input may only partially alleviate the above issue because scrambling the input (such as 64b/66b encoding) can still produce arbitrarily long run lengths of a given signal level, and limited-disparity encoding schemes such as 8b/10b encoding can have a large bandwidth penalty. Having some knowledge about the input signal behavior can help to further reduce the error associated with long run lengths. For example, if we know that both signal levels generally change in tandem (which is the case when environmental noise affects the system), then when the system observes that one of the two signal levels (e.g., "1") is increasing, the system can also increase the other signal level (e.g., "0") by an estimated magnitude based on the observed single level. In one embodiment, this estimated magnitude needs to be less than the real updated magnitude, so that the updates from actual measurements can override the estimated updates. In addition to this requirement, the magnitude of the estimated update can be tuned to match expected amplitude variation behavior.

The present embodiments provide a noise tracking and cancellation circuit for bounded and sufficiently band-limited transceiver noise, which can efficiently track and compensate for input noise and amplitude variations without using a differential architecture. In some embodiments, the noise tracking and cancellation circuit includes two feedback loops that independently track and predict the two input signal levels "1" and "0." This circuit may be incorporated into the receiver-side of a single-ended signal channel to detect the common mode noise in both of the two received signal levels at the receiver. However, the proposed noise tracking and cancellation circuit can be used in data signaling channels other than single-ended data signaling channels. The proposed noise tracking and cancellation circuit has shown power overhead and area overhead significantly smaller than the 100% power and area overhead of a differential architecture.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for tracking and compensating for an input signal noise in a receiver, comprising:
   receiving an input signal comprising two signal levels associated with two different expected values;
   for each of the two signal levels, generating an error signal by comparing the input signal value of the signal level with an expected signal value associated with the signal level;
   updating the expected values associated with the two signal levels based on the generated error signals;
   generating a threshold signal value based on two updated expected values associated with the two signal levels;
   receiving, at the receiver, the threshold signal value; and
   outputting, by the receiver, a digital signal based on the input signal and the threshold signal value, wherein the receiver compensates for the input signal noise in the received input signal using the threshold signal value.

2. The method of claim 1, wherein prior to receiving an input signal, the method further comprises initializing the threshold signal value using a training data pattern.

3. The method of claim 1, wherein the two signal levels correspond to logic one and logic zero, respectively, and wherein the threshold signal value is substantially halfway between the two signal levels.

4. The method of claim 1, wherein the method further comprises:
   for each of the two signal levels, updating the expected signal value for the signal level based at least on the associated error signal.

5. The method of claim 4, wherein updating the expected signal value for each of the two signal levels includes:
   accumulating the associated error signal using a digital accumulator; and
   using the digital output of the digital accumulator to represent the digital expected signal value for the signal level.

6. The method of claim 5, wherein the method further comprises converting the digital expected signal value to an analog expected signal value for the signal level.

7. The method of claim 5, wherein generating the threshold signal value based on at least one of the two error signals includes computing an average value of the two digital expected signal values for the two signal levels to obtain the generated threshold signal value.

8. The method of claim 1, wherein generating the threshold signal value based on at least one of the two error signals includes: computing the average of the two error signals to obtain an average error signal; and generating the threshold signal value by adding the average error signal to the threshold signal value.

9. The method of claim 1, wherein generating the threshold signal value based on at least one of the two error signals includes generating the threshold signal value by adding one of the two error signals to the threshold signal value.

10. The method of claim 1, wherein the threshold signal value is used to track and cancel common-mode noise in both of the two signal levels.

11. A circuit for tracking and compensating for noise in an input signal, comprising:
   a first channel configured to track a signal value associated with a first signal level of the input signal and to generate a first error signal by comparing the input signal value of the first signal level with an expected signal value for the first signal level, wherein the first channel is further configured to update the expected signal value for the first signal level based on the first error signal;
   a second channel coupled in parallel to the first channel and configured to track the signal value associated with a second signal level of the input signal and to generate a second error signal by comparing the input signal value of the second signal level with an expected signal value for the second signal level, wherein the second channel is further configured to update the expected signal value for the second signal level based on the second error signal;
   an averaging circuit coupled to an output of the first channel and an output of the second channel and configured to generate a threshold signal value based on the two updated expected values associated with the two signal levels; and
   a receiver configured to receive the input signal and the threshold signal value and to output a digital signal, wherein the receiver compensates for the input signal noise in the received input signal using the threshold signal value.

12. The circuit of claim 11, wherein each of the first channel and second channel further comprises:
   a level comparator to generate an error signal by comparing the signal value of the associated signal level of the input signal with an expected signal value of the associated signal level;
   a digital accumulator coupled to the output of the level comparator to accumulate the associated error signal; and
   a digital-to-analog converter coupled to the output of the digital accumulator to convert the output of the digital accumulator to the expected signal value of the associated signal level.

13. The circuit of claim 12, wherein the input signal is coupled to an input of the level comparator in each of the first channel and the second channel.

14. The circuit of claim 12, wherein the level comparator in each of the first channel and the second channel receives a common clock signal which determines the sampling rate of the error signal.

15. The circuit of claim 12,
   wherein the digital accumulator of the first channel is enabled when the signal value of the input signal is associated with the first signal level, and is disabled when the signal value of the input signal is associated with the second signal level; and
   wherein the digital accumulator of the second channel is enabled when the signal value of the input signal is associated with the second signal level, and is disabled when the signal value of the input signal is associated with the first signal level.

16. The circuit of claim 12, wherein the averaging circuit receives the error signals from the outputs of the two level comparators, and wherein the averaging circuit is configured to generate the threshold signal value based at least on the average of the two error signals.

17. The circuit of claim 12, wherein the averaging circuit receives the accumulated error signals from the outputs of the digital accumulators, and wherein the averaging circuit is configured to generate the threshold signal value based at least on the average of the two accumulated error signals.

18. The circuit of claim 11, wherein the circuit is located on a receiver of a single-ended data signaling channel.

19. The circuit of claim 11, wherein the threshold signal value is used to track and cancel common-mode noise in both of the two signal levels.

20. A data communication system, comprising:
   a transmitter;
   a receiver; and
   a data signaling channel coupled between the transmitter and the receiver;
   wherein the receiver further comprises:
   a receiving circuit for receiving an input signal from the transmitter;
   a first channel configured to track a signal value associated with a first signal level of the input signal and to generate a first error signal by comparing the input signal value of the first signal level with an expected signal value for the first signal level, wherein the first channel is further configured to update the expected signal value for the first signal level based on the first error signal;
   a second channel coupled in parallel to the first channel and configured to track the signal value associated with a second signal level of the input signal and to generate a second error signal by comparing the input signal value of the second signal level with an expected signal value for the second signal level, wherein the second channel is further configured to update the expected signal value for the second signal level based on the second error signal;

an averaging circuit coupled to an output of the first channel and an output of the second channel and configured to generate a threshold signal value substantially halfway between the first and second signal levels based on the two updated expected values associated with the two signal levels; and wherein the receiving circuit is further configured to receive the threshold signal value and to output a signal value based on the input signal and the threshold signal value, wherein the receiving circuit compensates for the input signal noise in the received input signal using the threshold signal value.

\* \* \* \* \*

UNITED STATES PATENT AND TRADEMARK OFFICE
CERTIFICATE OF CORRECTION

Page 1 of 1

PATENT NO. : 9,071,486 B2
APPLICATION NO. : 13/944463
DATED : June 30, 2015
INVENTOR(S) : Eric Chang et al.

It is certified that error appears in the above-identified patent and that said Letters Patent is hereby corrected as shown below:

Specification

At column 7, line 15, delete the term "zeros [N-1:0]." and replace it as follows: -- zeros[N-1:0]. --

At column 8, line 56, delete the term "zeros [N-1:0]." and replace it as follows: -- zeros[N-1:0]. --

At column 9, line 10, delete the term "zeros [N-1:0]." and replace it as follows: -- zeros[N-1:0]. --

Claims

In claim 1 (at column 10, line 61) delete the word "on" and replace it with the words -- on the --

Signed and Sealed this
Twelfth Day of April, 2016

Michelle K. Lee
*Director of the United States Patent and Trademark Office*